United States Patent [19]

Petzold et al.

[11] Patent Number: 5,206,805

[45] Date of Patent: Apr. 27, 1993

[54] CONTINUOUSLY VARIABLE TRANSMISSION CLUTCH CONTROL SYSTEM INCLUDING SPECIAL START MODE OPERATION

[75] Inventors: Werner P. Petzold, Harwood Heights, Ill.; William P. Umlauf, Schererville, Ind.

[73] Assignee: Borg-Warner Automotive, Inc., Sterling Heights, Mich.

[21] Appl. No.: 377,747

[22] Filed: Jul. 6, 1989

Related U.S. Application Data

[63] Continuation of Ser. No. 25,476, Mar. 13, 1987, abandoned.

[51] Int. Cl.$^5$ .............................................. B60K 41/02
[52] U.S. Cl. .............................. 364/424.1; 192/0.032; 192/0.076; 192/0.096
[58] Field of Search ................ 364/424.1; 74/866; 192/0.032, 0.075, 0.076, 0.096

[56] References Cited

U.S. PATENT DOCUMENTS

| | | | |
|---|---|---|---|
| 4,246,807 | 1/1981 | Kofink | 74/872 |
| 4,397,379 | 8/1983 | Baudoin | 192/0.032 |
| 4,438,664 | 3/1984 | Fiala | 74/866 |
| 4,583,627 | 4/1986 | Kumura et al. | 192/0.076 |
| 4,610,183 | 9/1986 | Nobumoto | 74/866 |
| 4,648,496 | 3/1987 | Petzold et al. | 192/0.076 |
| 4,653,021 | 3/1987 | Oshiage | 192/0.032 |
| 4,663,714 | 5/1987 | Cornell et al. | 364/424.1 |
| 4,665,773 | 5/1987 | Hiramatsu et al. | 74/866 |
| 4,667,787 | 5/1987 | Hofmann | 192/0.032 |
| 4,791,568 | 12/1988 | Hiramatsu et al. | 364/424.1 |
| 4,799,158 | 1/1989 | Patil | 364/424.1 |
| 4,803,899 | 2/1989 | Kumura | 364/424.1 |
| 4,805,751 | 2/1989 | Ohkumo et al. | 192/0.076 |

FOREIGN PATENT DOCUMENTS

| | | |
|---|---|---|
| 3404156 | 8/1985 | Fed. Rep. of Germany . |
| 2165914A | 4/1986 | United Kingdom . |

Primary Examiner—Vincent N. Trans
Attorney, Agent, or Firm—Willian Brinks Olds Hofer Gilson & Lione, Ltd.

[57] ABSTRACT

The system provides an improved clutch control system for use in a continuously variable transmission system. The system provides for generation of a clutch pressure setpoint to re-engage the clutch during special conditions in which the torque created by the vehicle inertia would tend to drive the engine to an undesirable operating point. Clutch slip speed is monitored as a difference value and integrated to provide a gradually decreasing error signal to return the clutch input speed to the clutch output speed, at which time clutch lockup will occur. Additionally, throttle position is monitored and a maximum torque schedule used to provide a maximum torque signal to prevent driver demand from undesirably racing the engine in similar conditions. A filtered output of the maximum torque schedule provides a pressure setpoint signal representative of actual driver demand which may be added to the clutch slip speed error signal to generate the clutch pressure setpoint. In this fashion, an engine may be loaded by an increase in the clutch pressure at the same time that the clutch input speed is returned to the clutch output speed to restore clutch lock up. Addition of a constant value to the clutch slip speed error signal ensures positive clutch lockup.

23 Claims, 6 Drawing Sheets

CONTINUOUSLY VARIABLE TRANSMISSION CLUTCH CONTROL SYSTEM INCLUDING SPECIAL START MODE OPERATION

This application is a continuation of application Ser. No. 025,476, filed Mar. 13, 1987 now abandoned.

BACKGROUND OF THE INVENTION

The present invention generally relates to the continuously variable transmission art. More particularly, the present invention relates to clutch control for continuously variable transmissions and to providing desired clutch control in particular driving circumstances.

The art contains numerous examples of the operation and construction of continuously variable transmissions (CVT's), e.g., U.S. Pat. No. 4,522,086 and U.S. Pat. No. 4,458,318, entitled Control System for Continuously Variable Transmission, and Control Arrangement for a Variable Pulley Transmission, respectively. These patents generally describe the mechanics and controls for a CVT system utilizing two adjustable pulleys, each pulley having at least one sheave which is axially fixed and another sheave which is axially movable relative to the first sheave. A flexible belt of metal or elastomeric material intercouples the pulleys. The interior faces of the pulley sheaves are beveled or chamfered. Thus, as the axially displaceable sheave moves relative to the fixed sheave, the distance between the sheaves and, thus, the effective pulley diameter may be adjusted. The displaceable sheave includes a fluid constraining chamber for receiving fluid to move the sheave and thus change the effective pulley diameter; as fluid is exhausted from the chamber, the pulley diameter changes in the opposite sense. Generally, the effective diameter of one pulley is adjusted in one direction as the effective diameter of the second pulley is varied in the opposite direction, thereby effecting a change in the drive ratio between the input shaft coupled to an input pulley and an output shaft coupled to an output pulley. The ratio changes continuously as the pulley diameters vary. Such transmissions frequently are referred to in the art as a continuously variable transmission, CVT.

Through the years various developments have refined and improved the hydraulic control system which is used to pass fluid into the fluid holding chamber of each adjustable pulley. An example of such a hydraulic system is shown in U.S. Pat. 3,115,049—Moan. In that patent, control of the secondary pulley adjustable sheave regulates the belt tension, while a different circuit regulates fluid into and out of the primary sheave to regulate the transmission ratio. U.S. Pat. No. 4,152,947—van Deursen et al.-also describes control of a CVT. In both systems, the line pressure of the fluid applied to hold the belt tension by pressurizing the secondary chamber is kept at a relatively high value. An improved control system subsequently was developed to reduce the main line fluid pressures supplied to the secondary sheave chamber as a function of torque demand. This improved system is described and claimed in U.S. Pat. No. 4,522,086 entitled "Control System for Continuously Variable Transmission," which issued Jun. 11, 1985, and is assigned to the assignee of this application. Further work resulted in an improved control system which reduced the line pressure applied to the secondary chamber to a lower, safer operating pressure and also provided a lower control pressure for other portions of a hydraulic control system. This system is described in an application entitled "Hydraulic Control System for a Continuously Variable Transmission", Ser. No. 421,198, filed Sep. 22, 1982, which issued Dec. 15, 1987, as U.S. Pat. No. 4,712,453, and assigned to the assignee of this application.

Additional significant advances in CVT control systems have been described and claimed in another application also entitled "Hydraulic Control System for a Continuously Variable Transmission," Ser. No. 717,913, filed Mar. 29, 1985, which issued Jan. 12, 1988, as U.S. Pat. No. 4,718,308, and assigned to the assignee of this application.

Another U.S. Pat. No. 4,648,496, issued Mar. 10, 1987, entitled "Clutch Control System for a Continuously Variable Transmission" further describes control logic techniques for regulating pressure at a clutch in a CVT system to provide the desired torque transfer from an engine to a vehicle drive line. In that system, clutch control depends on logical recognition of one of a number of operating modes.

A related, co-pending application entitled "Continuously Variable Transmission Clutch Control System", Ser. No. 25,391, filed Mar. 13, 1987 assigned to the assignee of the present application, discloses an improved clutch controller for use in CVT applications. Another related, co-pending application entitled "Ratio Control Technique For Continuously Variable Transmission Systems", Ser. No. 25,389, filed Mar. 13, 1987 assigned to the assignee of the present application, discloses an improved belt ratio control technique for use in CVT applications.

It has been recognized that particular driving conditions may exist during which a normal start mode for operation of the clutch control may not be appropriate. For example, in U.S. Pat. No. 4,648,496, a special start mode determination circuit 126 determines that special conditions, other than those of normal start, exist as the driver moves the manual selector into drive and steps into the accelerator. However, that system does not specify a detailed technique for operation of the clutch control system during special start mode operation other than in general sense. Likewise, the co-pending application entitled "Continuously Variable Transmission Clutch Control System" merely references other conditions in which the normal start mode operation described therein would not be applicable.

The teachings of each of the above referenced patents and co-pending applications are incorporated herein by reference, although none of the previously envisioned systems specifically addresses implementation of the control techniques disclosed herein.

BRIEF SUMMARY OF THE INVENTION

Accordingly, a principal object of the present invention lies in providing a continuously variable transmission clutch control system which generally overcomes the deficiencies of the prior art.

A more specific object of the present invention lies in providing clutch control for selected driving mode applications.

A more specific object of the present invention lies in the provision of clutch control techniques for continuously variable transmission driven vehicles during driving conditions in which total torque in the vehicle system tends to accelerate the engine upon clutch engagement, for example, during a transition from "hold" to "lock-up".

The present invention generally provides a clutch control technique for a continuously variable transmission in various driving situations. Recognition of conditions when total torque in the continuously variable transmission driven vehicle system will tend to accelerate the engine indicates special driving conditions. Normal clutch control, which controls engine speed explicitly in response to driver demand, is bypassed at this time. A maximum torque schedule, based on driver demand and clutch slip speed measurement control the clutch pressure setpoint for regulating a modulation signal to a clutch control valve and, hence, the pressure at the clutch. The clutch may then be returned to a lock-up position through a gradual process which gives a natural feeling response to a driver while providing a requisite system operation. The clutch control may also be returned to one of the operating modes dependent upon other system characteristics.

Additional and further objects and advantages of the present invention will become apparent from the following detailed description and accompanying drawings.

BRIEF DESCRIPTION OF THE DRAWINGS

The novel features of the present invention are set forth with particularity in the appended claims. The invention, together with the objects and advantages thereof, may be understood more fully by reference to the following detailed description taken in conjunction with the accompanying drawings in which like reference numerals are used to indicate like elements and of which:

DETAILED DESCRIPTION OF A PREFERRED EMBODIMENT

Figure 1:
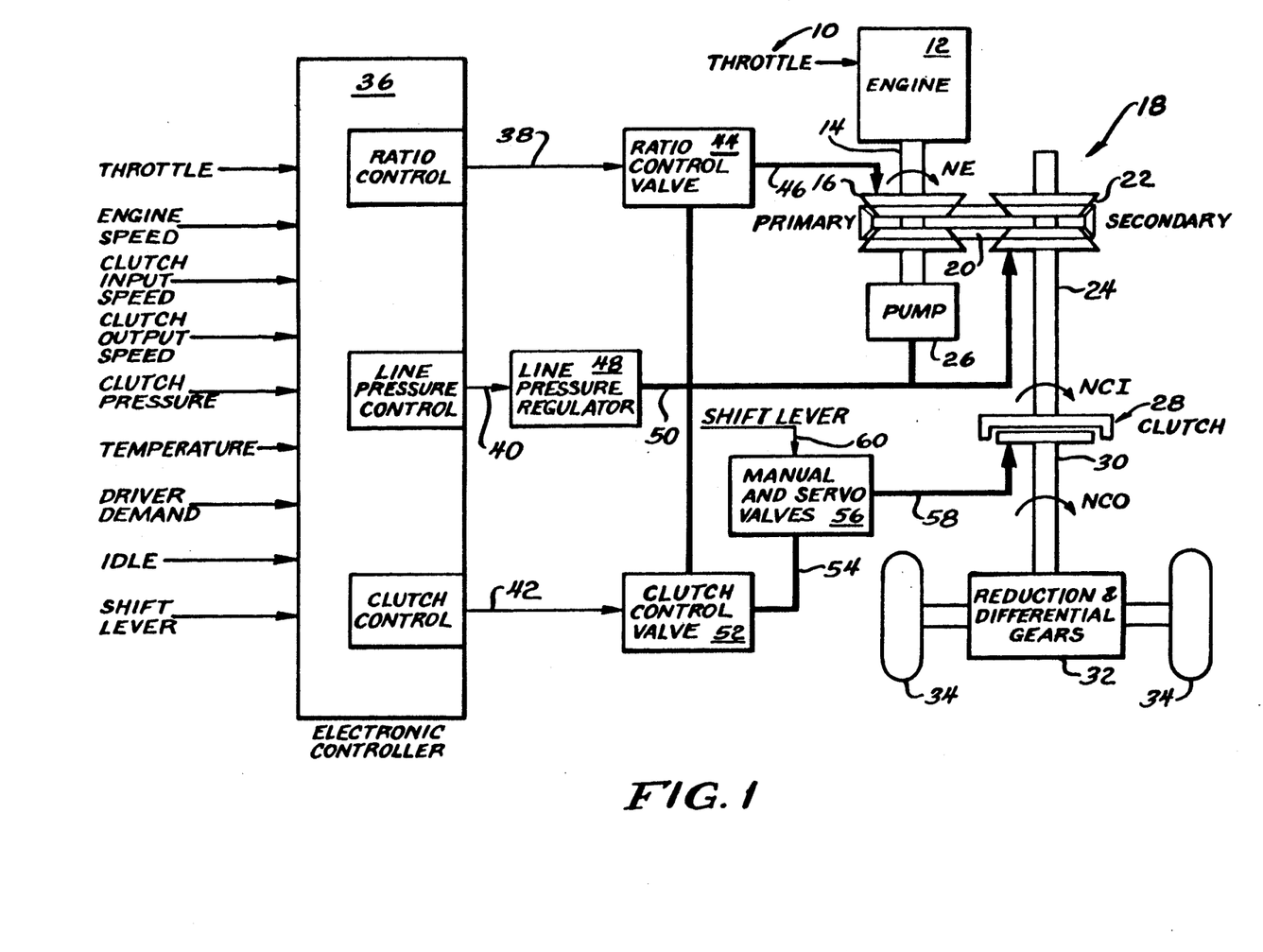
FIG. 1 is a block diagram representation of a continuously variable transmission driven system.

As shown in FIG. 1, a throttle signal 10 controls the operation of an engine 12 which transmits torque via shaft 14 to a primary pulley 16 in a CVT 18. In a typical embodiment, a flywheel and damping arrangement may be included on shaft 14 between the engine 12 and the primary pulley 16. A metal or elastomeric belt 20 connects the primary pulley 16 to a secondary pulley 22 to transmit torque to a second shaft 24. A pump 26 may also be driven by the first shaft 14 to provide line pressure for the hydraulic system and the controls of the CVT 18.

The second shaft 24 drives the input to a clutch 28 which in turn provides a torque to a third shaft 30. The third shaft 30 drives a reduction and differential gear arrangement 32 as a drive line to provide power to the vehicle wheels 34.

In operation, an electronic controller 36 receives throttle, engine speed, clutch input speed, clutch output speed, clutch pressure, temperature, driver demand, idle, shift lever and other information input signals as shown at the left of FIG. 1. The electronic controller 36 operates in a logical fashion to provide a ratio control signal on line 38, a line pressure control singal on a line 40 and a clutch control singal on a line 42. The signal on the line 38 to a ratio control valve 44 controls the hydraulic pressure on a line 46 to the primary pulley 16 of the CVT 18 to control the ratio between the primary pulley 16 and the secondary pulley 22, i.e.. the belt ratio. The signal on the line 40 communicates with a line pressure regulator 48 which via a line 50 provides line pressure from fluid flow delivered by the pump 26 to the ratio control valve 44, a clutch control valve 52 and the secondary pulley 22. The output of the line pressure regulator on the line 50 also controls the pressure at the secondary pulley 22 to insure that the belt 20 does not slip. The output signal on the line 42 to the clutch control valve 52 controls the output of the clutch control valve 52 on a line 54 to the manual and servo valves 56 which controls the fluid flow on the line 58 to the clutch 28. This is the signal which controls or which provides the pressure at the clutch 28 and hence regulates the torque transfer from the second shaft 24 to the third shaft 30.

A shift lever signal on a line 60 provides an additional control of the manual and servo valves 56. When the shift lever signal on the line 60 indicates that the vehicle is in a neutral or park mode, the manual control within the valve arrangement 56 is closed. This prevents fluid from flowing to the clutch 28 and thus prevents any torque transfer through the clutch 28 when the vehicle is in the neutral mode.

A first arrow NE (N=speed; E=engine) on the first shaft 14 indicates one acceptable point of measurement for engine speed. A second arrow NCI (CI=clutch input) on the second shaft 24 indicates an acceptable point of measurement for the clutch input speed. A third arrow NCO (CO=clutch output) indicates an acceptable point of measurement for the clutch output speed, which corresponds to vehicle speed. Those skilled in the art will recognize that the various speed values may be accurately obtained at other locations as desired.

It should be appreciated that the ratio of NE to NCI will correspond to and provide a measure of the transmission belt ratio. The difference between NCI and NCO provides a measure of the slippage at the clutch 28. When NCI equals NCO, the clutch 28 is locked-up with no slippage.

Information inputs from the engine, transmission, and vehicle driver control the electronic controller 36 to place the system into one of five operating modes. A related application for an Continuously Variable Transmission Clutch Control System also incorporates a sixth mode - an engage mode - which provides a transition between neutral and hold modes.

The following provides a summary of the five modes important to the system in which the present application may be used: neutral, hold, normal start, special start and drive.

NEUTRAL MODE: The driver manually places the shift lever in a neutral or park position. This closes the manual valve to the clutch which prevents any pressure from being applied to the clutch plates. If the vehicle speed is low, the ratio control will downshift the continuously variable driven transmission to full low. If the vehicle is at a significant speed, the ratio control will attempt to synchronize the clutch input and output speeds. This enables a more rapid clutch re-engagement should the shift lever be moved from neutral to drive while the vehicle is still at a significant speed. Also, the desired control signal to the clutch control valve during this mode is a "full-on" signal. This provides a rapid response at the clutch to a shift to a driving mode.

HOLD MODE: The system may enter this mode whenever the shift lever is in a position other than neutral or park. This opens the manual valve and allows pressure to be applied to the clutch plates. In this mode, the clutch pressure loop strokes the clutch by means of a pulse width modulation (PWM) operated electrohydraulic control valve. The clutch pressure loop maintains a predetermined constant pressure on the clutch for vehicle "creep". This corresponds to the pressure which overcomes the biasing spring and brings the clutch plates into contact. The ratio control operation in this mode is the same as during the neutral mode.

NORMAL START MODE: In response to a driver demand at the throttle, the system modulates the clutch pressure to control the engine speed to an engine speed setpoint obtained from a schedule that is a function of the throttle as explained in the related application entitled "Continuously Variable Transmission Clutch Control System." The clutch pressure regulates the amount of vehicle load torque to the engine. The normal start mode can be used only if a total torque (engine torque and vehicle torque) flows in a direction which would tend to accelerate the vehicle. The ratio control maintains the belt ratio throughout the start mode so as not to interact with clutch control of the engine speed.

SPECIAL START MODE: In situations in which the flow of total torque would tend to accelerate the engine from the existing torque of the moving vehicle, special start mode should be used to engage the clutch with or without driver demand. Care must be taken in these conditions to avoid accelerating the engine above the maximum stall speed. Normal application of clutch pressure loads down the engine when the vehicle is moving at a very slow speed or stops. Significant vehicle speed, however, generates a vehicle inertial torque which will add to the engine torque so that the engine speed cannot be controlled. A smooth engagement may be achieved by controlling the clutch pressure as a function of the clutch slip speed and a maximum torque schedule based on driver demand as described in the present application. The ratio control again attempts to maintain the belt ratio so as not to interact with the slip speed synchronization achieved during the special start mode.

DRIVE MODE: Once the clutch output speed equals the clutch input speed, the clutch locks up. At this time the clutch valve is opened fully to the line pressure, and engine speed control is maintained by the ratio control system of the continuously variable transmission.

The present application specifically concerns the operation of the system in a special start mode. Driving conditions may exist for operation of the special start mode in a variety of circumstances, all of which tend to accelerate the engine due to the inertia of the moving vehicle, for example, 1) when a driver shifts from drive to neutral and back into drive before the vehicle slows to a speed where the vehicle inertia torque is insignificant; 2) when a vehicle is rolling down a hill and the driver shifts from neutral into drive; and 3) when the vehicle is skidding on ice or otherwise and the driver removes the braking force while significant vehicle speed remains.

Figure 2:
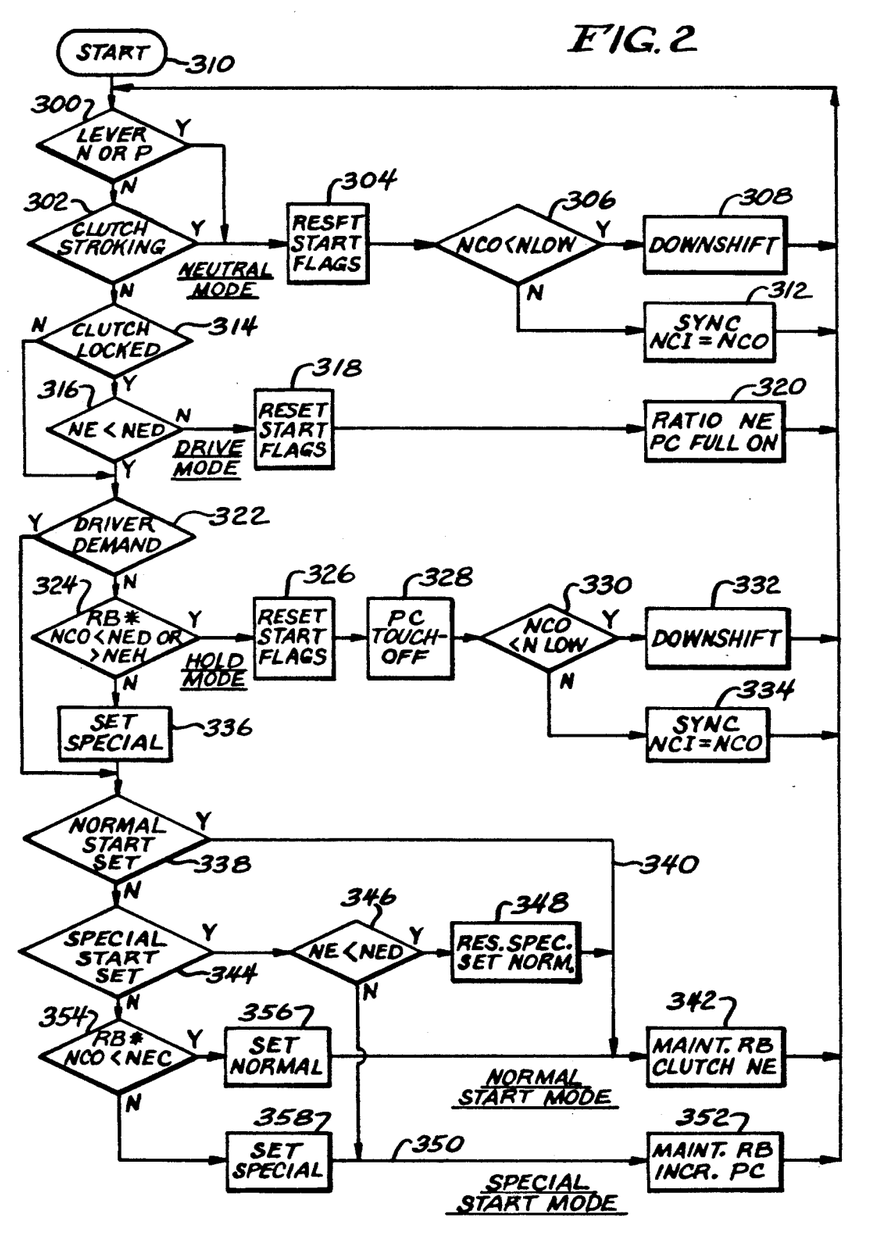
FIG. 2 is a logic flow chart for determination of operational modes for clutch control in a variable transmission control system.

Referring now to FIG. 2, therein is shown an overall logic flow chart for selection between the various operating modes for the clutch control system. The following table provides exemplary reference points for engine speed, referenced in the flow chart on FIG. 2:

TABLE I

| Clutch Disengage Speed (NED) | 1000 RPM |
|---|---|
| Lowest Setpoint Speed (NEC) | 1400 RPM |
| Maximum Engine Speed (NEH) | 6000 RPM |
| Minimum Clutch Output Speed (NLOW) | 700 RPM |

Reference should also be made to the diagram of FIG. 1 in which the engine speed is identified in shorthand notation as NE, clutch input speed is identified in shorthand notation as NCI and clutch output speed is identified in shorthand notation as NCO.

Referring now to the system operation set forth in the flow chart in FIG. 2, an initial determination is performed at a decision block 300 to determine whether the manual shift lever is at neutral or park. If the shift lever is at neutral or park, the system enters a neutral mode for operation as described above. If the shift lever is not in neutral or park, the system determines, at block 302 whether the clutch is stroking (this corresponds to the engage mode discussed in the related application entitled "Continuously Variable Transmission Clutch Control System"). If the clutch is stroking, then the system remains in the neutral mode.

Once the system enters the neutral mode, both of the normal and special start flags are reset at block 304 and the system determines, at a block 306, whether the clutch output speed is less than some minimum clutch output speed. If yes, the system downshifts at a block 308 through an appropriate signal to the ratio control system and loops back to a start block 310 to determine an appropriate mode. If the clutch output speed is not less than the minimum speed, the system attempts to synchronize the clutch input speed and the clutch output speed at a block 312, again by an appropriate signal to the ratio control system, and loops back to start at block 310.

If after determining whether the clutch is stroking at the block 302, the system determines that it is not in a neutral mode, it then determines whether the clutch is locked at a decision block 314. If no, then the system determines that the drive mode has not been entered and advances to a further determination. However, if the clutch is locked as determined at the block 314, then the system determines whether the engine speed is less than the clutch disengage speed at a block 316. If no, meaning that the clutch is locked and the engine speed is not below the clutch disengage speed, then the system enters the drive mode and resets the start flags at a block 318. The ratio control system then controls the engine speed and the clutch pressure is in a full-on state as shown at a block 320. The system then loops back to the start block 310.

If the system is not in the drive mode, it determines whether driver demand exists at a decision block 322. If no, at decision block 324 the system then determines whether the clutch output speed times the transmission belt ratio is less than the clutch disengage speed or greater than the maximum engine speed. If yes, then the system enters the hold mode and resets the start flags at a block 326.

In the present and related, co-pending applications, the term driver demand has been used synonymously with the term throttle. In a general sense, throttle and driver demand represent the vehicle driver stepping down on, or into, the accelerator pedal. However, it should be recognized that in some instances the term driver demand must be viewed as broader than throttle. For example, a driver may create a demand by depressing the accelerator a specific amount; if a small dead band exists in the throttle response, such a depression (demand) may not result in a throttle variation depending upon the size of the dead band. A driver demand, none-the-less, would exist under these conditions. The decision block 322 looks at driver demand in the broader sense, without regard to the existence of a variation in throttle.

In the hold mode, as shown in a block 328, the pressure control signal is held at the touch off pressure, i.e., that pressure just significant to overcome the clutch spring and to bring the clutch plates into contact. Herein the system also compares the clutch output speed to the minimum clutch output speed at a block 330. If the clutch output speed is less than the minimum speed, then the system downshifts at a block 332 and loops back to the start block 310. If the clutch output speed is not less than the minimum speed, the system attempts to synchronize the clutch input speed with the clutch output speed at a block 334 and loops back to the start block 310.

Referring again to the decision block 324, if the transmission belt ratio times the clutch output speed is not less than the clutch disengage speed or greater than the maximum engine speed, and there is no driver demand as measured at decision block 322, then the system sets a special start flag at a block 336. The speed check at the decision block 324 monitors the torque flow for the total vehicle system. The speed check of RB*NCO<NED determines if a clutch re-engagement at these conditions will cause the engine to stall. Likewise, the speed check of RB*NCO>NEH will determine if the engine speed will be greater than the maximum allowable engine speed in a clutch re-engagement. If one of the two conditions are true, the clutch will remain in hold mode. Otherwise, the system will set the special start flag to allow the system to operate in the special start mode (NEH>RB×NCO>NED) to allow the clutch to re-engage to a lock-up condition.

At this time, the system advances to a block 338, which is the same point to which it advances if a driver demand is recognized at the decision block 322. At the decision block 338, the system determines whether a normal start flag has been set. If yes, then the system advances to the normal start mode as shown by the line 340. In a normal start mode, the system maintains the belt ratio and controls the engine speed through the clutch pressure as shown at a block 342 and explained in more detail in the related application entitled "Continuously Variable Transmission Clutch Control System", Ser. No. 25,391, filed on an even date herewith.

However, if the normal start flag is not set as determined at the block 338, then the system determines whether a special start flag has been set at a block 344. If yes, then the system determines whether the engine speed is less than the clutch disengage speed at a block 346. If yes, then the system resets the special start flag and sets the normal start flag at a block 348 and advances to the normal start mode as shown at the line 340. At that point, normal start mode operation occurs as explained above.

The system of the preferred embodiment performs the comparison of the decision block 346 (NE<NED) even if a special start flag has been set, because clutch control under the special start mode parameters does not control engine speed. Without engine speed control, the engine may be stalled undesirably. Accordingly, when engine speed is less than the clutch disengage speed, the system returns to normal start mode operation. In this mode (normal start), engine speed is controlled and engine stalling can be prevented.

If the engine speed is not less than the clutch disengage speed as determined at the block 346, then the system maintains the special start mode as shown at the line 350. The system maintains the belt ratio and increments the pressure control setpoint as shown at a block 352 and explained more fully below. The system then loops back to the start block 310.

Referring again to the decision block 344, if the special start flag has not been set, then the system advances to a decision block 354, at which it determines whether the transmission belt ratio times the clutch output speed is less than the lowest engine speed setpoint obtained from the normal start mode engine speed schedule. Once again, the system at this block monitors the direction of total torque flow. If yes, then the system sets a normal start flag at a block 356 and advances to the normal start mode for operation as explained above. If no, then the system advances to a block 358, sets the special start flag and enters the special start mode for operation.

Figure 3:
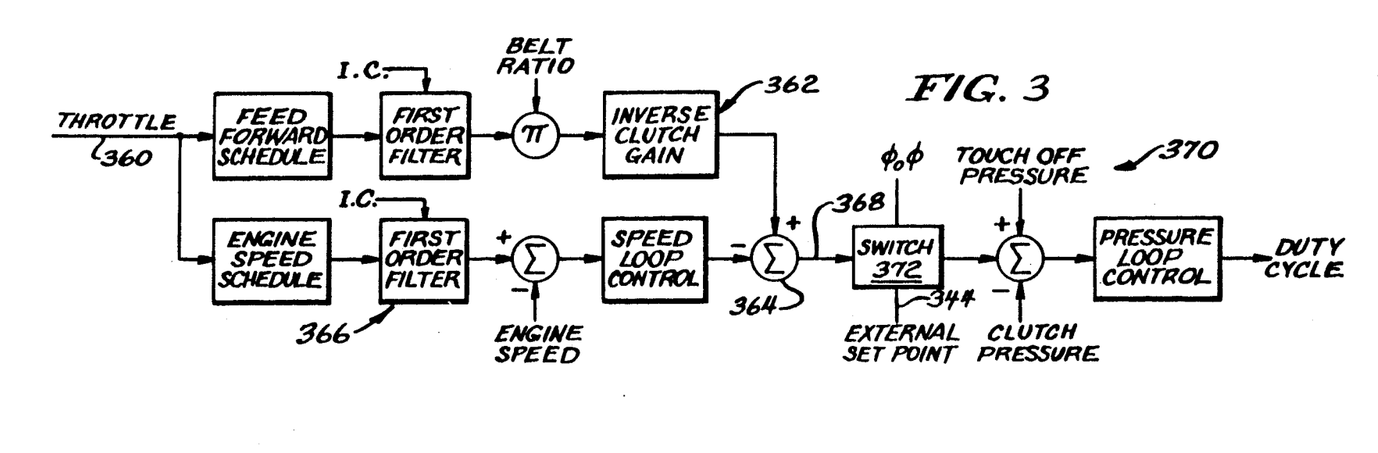
FIG. 3 is a block diagram representation of a clutch control system for application in a continuously variable transmission during normal start mode.

Referring now to FIG. 3, therein is shown a block diagram for a clutch control system such as that described in copending, related application entitled Continuously Variable Transmission Clutch Control System. In this system, the throttle input signal on line 360 provides a feed forward pressure signal from an open control loop 362 to a summing junction 364. A throttle signal on the line 360 also goes to a closed loop engine speed control system 366 which provides a second input as an error signal to the summing junction 364. The output of summing junction 364 on a line 368 provides a pressure setpoint to a pressure control loop 370. The operation of the system illustrated in FIG. 3 may be more fully understood from referenced to co-pending application. In that application the operation of the feed forward loop 362 (identified therein as control loop 364), the engine speed control loop 366 (identified therein as control loop 68) and the pressure loop control system 370 (identified therein as control loop 110) is set forth more fully.

The co-pending application concerns the generation of a pressure setpoint at the line 368 to control, or to provide a setpoint for, the pressure control loop 370. If the block 372 is thought of as a switch, the external setpoint may be provided at a line 374 and the switch 372 toggled or selected when the special start mode conditions with which the present application is concerned have been recognized.

The pressure control loop 370 then operates in a fashion described in the co-pending application in response to the external setpoint signal received on the line 374 for a special start mode operation. The present system may be viewed as substituting for that of the referenced co-pending application during special start conditions.

Figure 4:
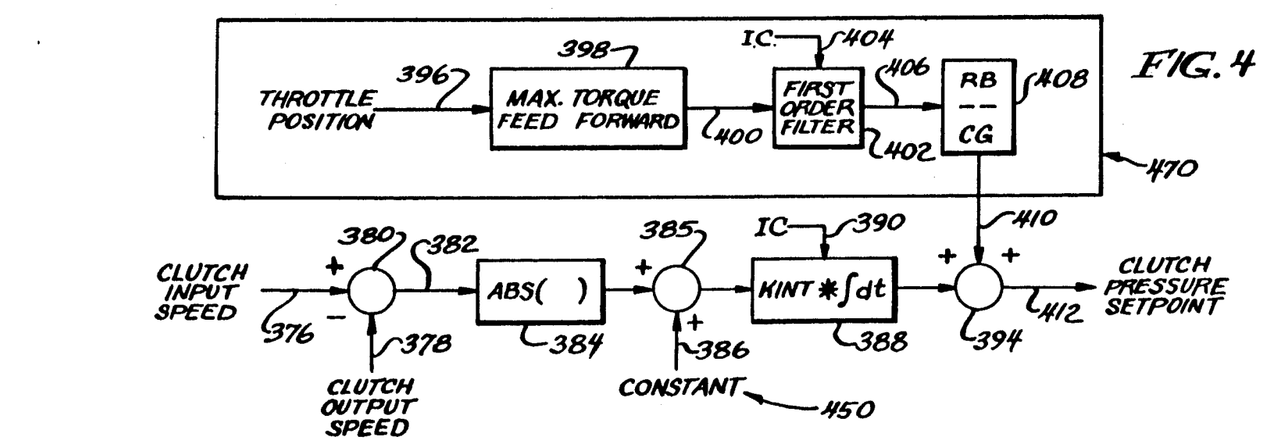
FIG. 4 is a block logic diagram illustrating a system according to the present invention for providing clutch control under special driving conditions.

Referring now to FIG. 4, therein is shown a block diagram of a system for providing a clutch pressure setpoint to the pressure control loop 370 during special start mode circumstances. When the logic determination illustrated in FIG. 2 indicates that special start mode operation is appropriate, the system in FIG. 4 may be thought of as substituting for the feedforward loop 362 and the engine speed control loop 366 to provide a clutch pressure setpoint to the pressure control loop 370.

Specifically, the system of FIG. 4 receives a clutch input speed on a line 376 and a clutch output speed at a line 378 to a summing junction 380 which generates a difference signal (clutch input speed minus clutch output speed) at a line 382. At a block 384, the absolute value of the difference value from the line 382 is generated and then provided to a summing junction 385. At the summing junction 385, a constant value from a line 386 is added to that absolute value. The signal is then multiplied by a gain factor (KINT.) and integrated at a block 388 in conjunction with initial conditions from a line 390 to provide a first clutch pressure setpoint at a line 392 to a summing junction 394.

The preferred embodiment desirably integrates the absolute value signal from the function block 384 to provide an increasing error signal in response to a difference between clutch input speed and clutch output speed. This tends to increase the pressure setpoint signal to increase the clutch pressure which tends to diminish the difference between clutch input speed and clutch output speed. Integration also provides a more desirable response in terms of vehicle driveability and driver expectations.

The system of FIG. 4 also receives a throttle position signal at a line 396, which at a block 398 provides a corresponding maximum torque feed forward value on a line 400. This signal passes through a first order filter 402 which in conjunction with an initial condition from a line 404 provides a modified maximum torque feed forward signal at a line 406. At a block 408 the signal from the line 406 is multiplied by the transmission belt ratio (RB) and divided by the clutch gain (CG) to provide a second input to the summing junction 394 on a line 410.

The function of the block 408 is equivalent to that of blocks 82 and 86 in related, co-pending applications, "Continuously Variable Transmission Clutch Control System". Alternately, the feed forward torque, multiplied by the belt ratio may be multiplied by the inverse clutch gain (ATTCLU) to achieve the same result. This may be preferable in microprocessor systems. The combination of the signals from the lines 392 and 410 is provided by summing junction 394 at a line 412 to provide a clutch pressure setpoint to the pressure control loop 370.

In operation the system looks at the absolute value of the difference between the clutch input speed and the clutch output speed. This value is then integrated to provide a clutch pressure error signal which increases the clutch pressure setpoint as appropriate. This change in clutch pressure tends to match the clutch input speed with the clutch output speed to generate a correspondingly smaller difference signal and hence a smaller integrated value, as the loop continues to operate. Accordingly, a large differential between the clutch input speed and the clutch output speed is gradually corrected to provide a smooth transition back to a lock up of the clutch, indicated by clutch input speed equalling clutch output speed.

A constant on the line 386 is added to provide a positive lockup at that point. Those skilled in the art will appreciate that the addition of the constant provides a slight ramping output from the integrating step 388.

In the preferred embodiment, the initial condition on the line 390 is chosen as zero. This prevents a jump at such times as the special start mode may be initiated.

The system loop 450 in FIG. 4 may be used in some applications to provide the sole indicia of appropriate clutch pressure during special start conditions. However, in some situations a driver may increase his demand and thereby increase the throttle, which can cause the engine to race in the special start mode. Typically, when the clutch input speed and the clutch output speed are not equal and the engine speed loop control is not operating, such as during special start mode, the pressure on the clutch does not control the engine speed and the engine can race undesirably, this provides an unexpected response for the driver and may damage the engine.

Figure 5A:
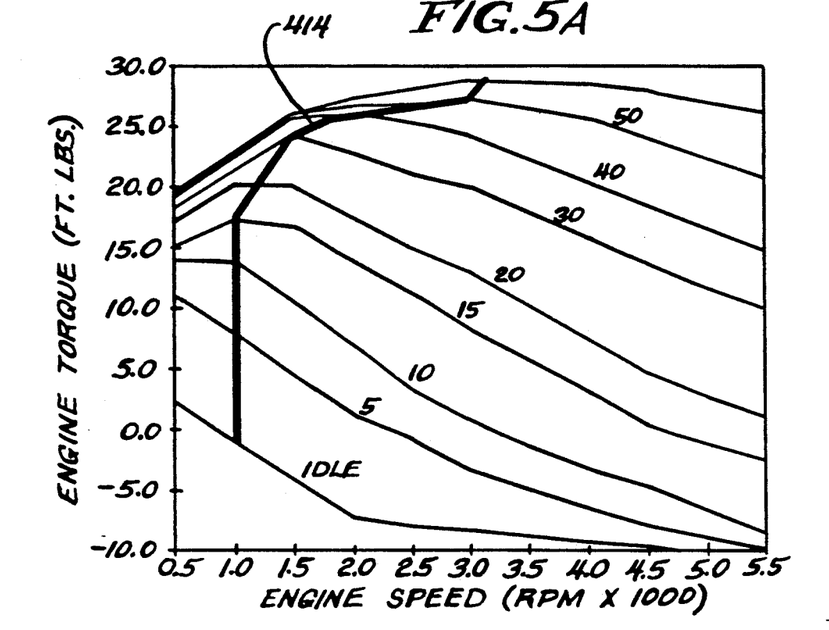
FIG. 5A is an exemplary engine map illustrating engine torque as a function of engine speed for a range of throttle positions.

To accommodate for this situation, the throttle position is monitored in the special start mode to provide a maximum torque signal. This maximum torque signal may be derived from an engine map as FIG. 5A. In FIG. 5A a maximum torque has been chosen for each throttle setting desirably to prevent the engine from racing in the special start mode in response to increased driver demand. The graph of FIG. 5B represents a function of the maximum torque against specific throttle settings corresponding to the line 414 in FIG. 5A.

Figure 5B:
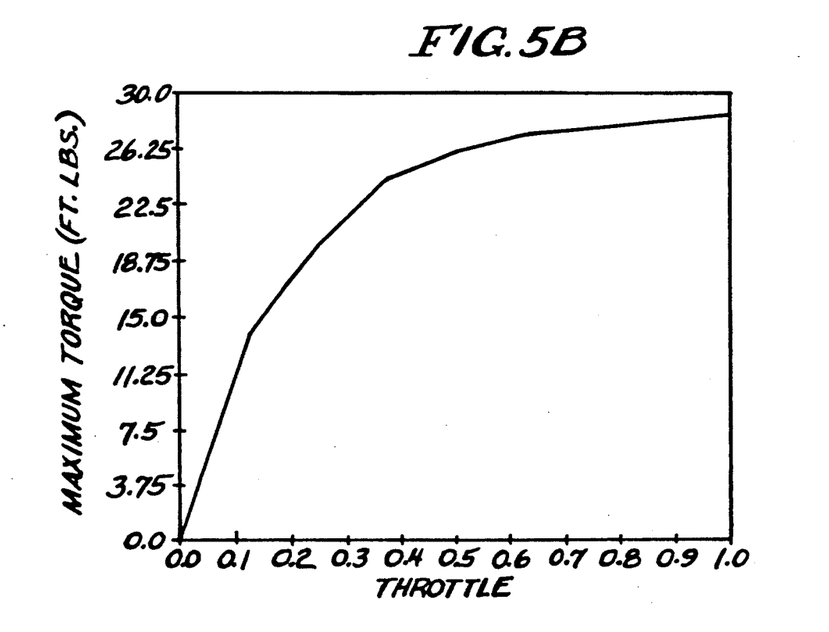
FIG. 5B is a graphic representation of selected maximum torque values as a function for throttle setting derived from the engine map of FIG. 5A.

In FIG. 4, the system can determine a maximum torque from FIG. 5B as a function of specific throttle settings. The first order filter 402 slows this response as a function chosen for the filter (these may be chosen empirically to provide a realistic driving response). The initial condition on line 404 is chosen to be equal to zero in the preferred embodiment to preclude lurching of the vehicle when the system is first initiated. Multiplying the output of this filter by the belt ratio (RB) and dividing by the clutch gain (CG) (or multiplying by the inverse clutch gain) converts the maximum torque to a pressure signal which is combined with that from the clutch input speed-clutch output speed differential loop to provide a desired clutch pressure setpoint on line 412.

Figure 6:
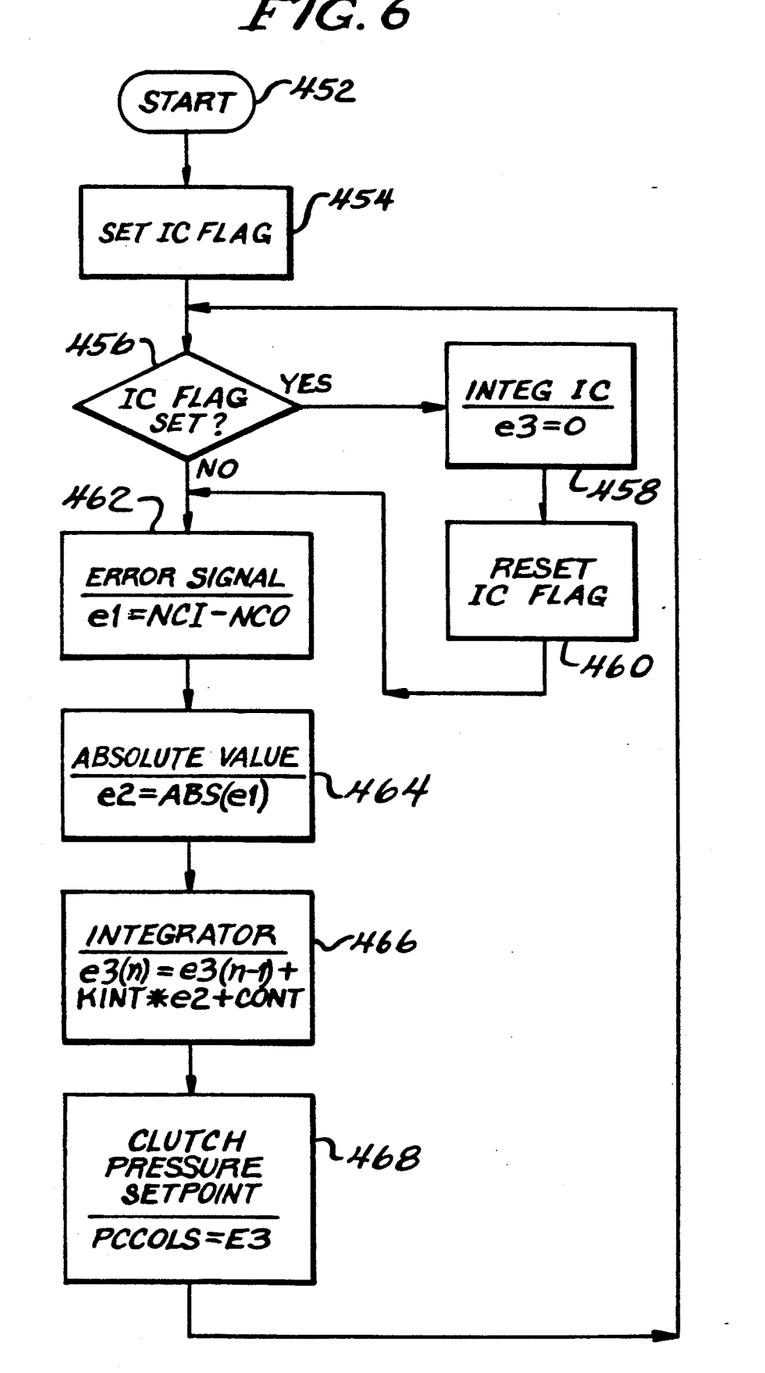
FIG. 6 is a logic flow chart for deriving a clutch pressure setpoint as a function of the clutch slip speed in a system according to the present invention.

Referring now to FIG. 6, therein is shown a flowchart for clutch slip speed loop 450 of FIG. 4. In FIG. 6 the logic flow chart proceeds from a logic start block 452 to the set initial condition flag block 454. The initial flag set is then checked at a decision block 456. If the flag has been set, the initial condition for integration at the system block 388 is set at zero at a block 458, and the initial condition flag is reset at a block 460. The system then branches back to a block 462, which it proceeds to from the decision block 456 if the initial condition flag has not been set. At the block 462, the system generates an error signal representing the difference between clutch input speed and clutch output speed. At block 464, the system then provides the absolute value of that error signal from the block 462. The absolute value is multiplied by the integral gain and is then integrated at a block 466 to provide a clutch pressure setpoint at a block 468. The system then loops back to decision block 456.

It should be appreciated that the flowchart of FIG. 6 may be modified slightly to provide a positive lock-up pressure when the clutch input speed equals clutch output. The addition of a constant value signal prior to the integration function block 466 provides just such a set output signal. The block diagram of FIG. 4 illustrates this operation at the summing junction 385. This operation desirably facilitates transfer of the system operating mode back to normal start or drive control.

Figure 7:
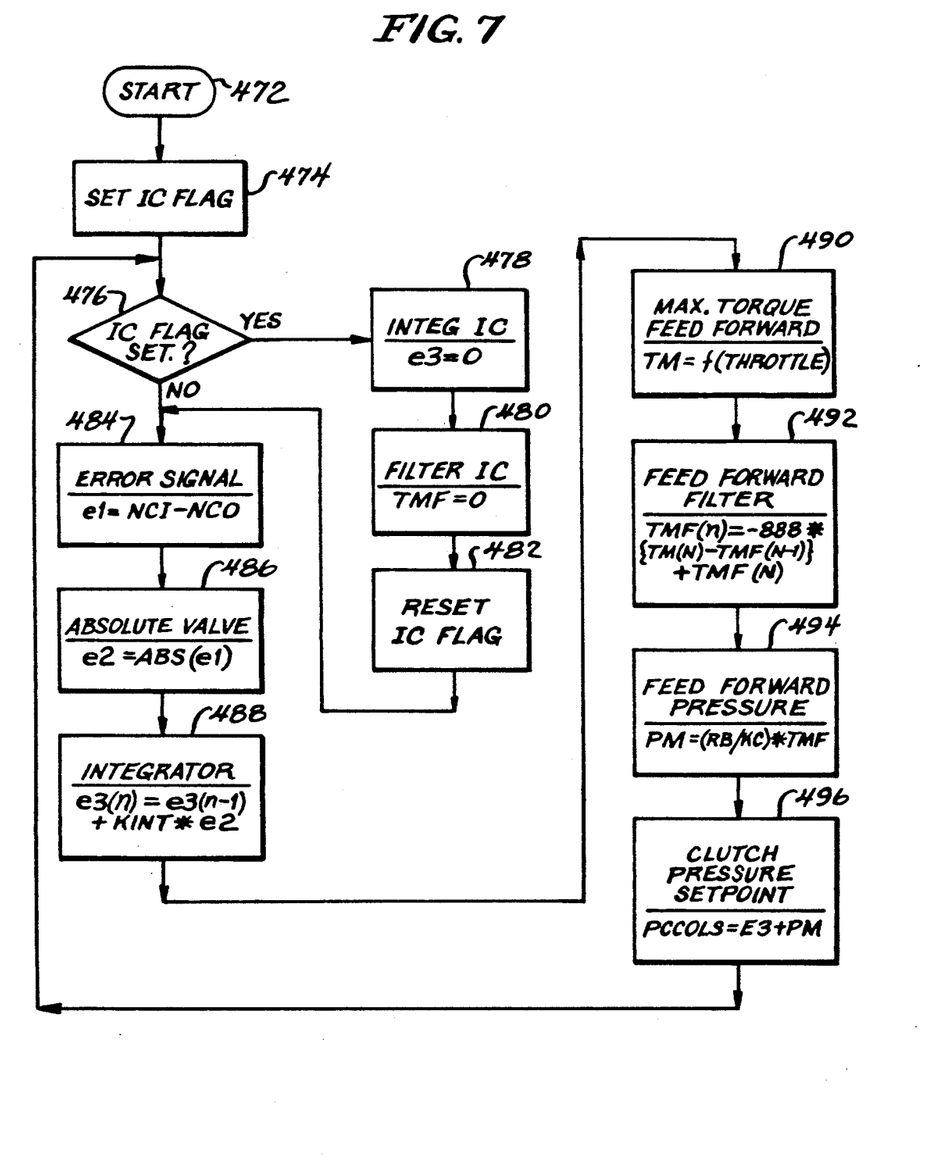
FIG. 7 is a logic flow chart for deriving a clutch pressure setpoint as a function of a maximum torque and clutch slip speed in a system according to the present invention.

Referring now to FIG. 7, therein is shown a flow chart representing the operation of the maximum torque feed forward 470 in conjunction with the clutch slip speed loop 450 from FIG. 4. As shown in FIG. 7 the system advances from a start block 472 to set the initial condition flags at a block 474. The initial condition flag is then monitored at a decision block 476. If it has been set, then the system at block 478 sets the initial condition of zero for integration (at system function block 388 of FIG. 4) and at block 480 sets the initial condition of zero for filtering (at system function block 402 of FIG. 4). The system then resets the initial condition flag at a block 482 and branches back to a block 484, to which the system proceeds from the decision block 476 if the initial condition flag was not set.

At the block 484 the system generates an error signal representative of the difference between the clutch input speed and the clutch output speed and advances to a next block 486. At the block 486 the system determines the absolute value of the signal from block 484 and advances to a next block 488. At the block 488, the system integrates the absolute value signal multiplied by the integral gain from the block 486 (at this point a constant may be added to the absolute value and integrated also) and advances to a next block 490. At the block 490 the maximum feed forward torque is determined from the throttle setting and provided to the feed forward filter at a next block 492. At the block 492, the system filters the feed forward maximum torque signal and the system provides the filtered signal to a next block 494. At the block 494, the feed forward torque signal is converted to a feed forward pressure by multiplying the torque signal by the belt ratio and dividing by the clutch gain. At the block 496 the system determines a clutch pressure setpoint as the sum of the feed forward pressure and the output of the integrator. The system then loops back to the decision block 476 to again examine the status of the initial condition flags.

Temperature compensation over the expected range of operating temperatures may be accomplished as taught in a copending application entitled "Temperature Compensation Technique For A Continuously Variable Transmission System," Ser. No. 25,392, filed on an even date herewith. Likewise, pulse width modulation for use in the preferred embodiment may be accomplished as taught in a copending application entitled "Pulse Width Modulation Technique," Ser. No. 25,477 filed on an even date herewith.

The present invention has been described above in terms of a number of preferred embodiments and the features thereof. Those features which are deemed to be novel are set forth with particularity in the appended claims. Such modifications and alterations as would be apparent to one of ordinary skill in the art and familiar with the teachings of this application also should be deemed to fall within the spirit and scope of the present invention. Interconnections between the system of the present invention and other elements for use in a continuously variable transmission system and specific program instructions based on the accompanying flow charts are deemed to be within the ordinary skill of the art.

What is claimed is:

1. A method for providing a clutch control signal in a continuously variable transmission system to a fluid-actuated clutch to transfer torque between an engine and a drive line mounted in a vehicle, said clutch having an associated supply line to supply fluid to apply the clutch and discharge fluid to release the clutch controlled by a clutch control valve assembly in said supply line including:

sensing input speed at said clutch;
   sensing output speed at said clutch;
   providing a signal representative of the absolute value of the difference between said clutch input speed and said clutch output speed; and
   integrating said absolute value signal to provide a speed difference pressure signal for controlling said clutch control valve.

2. The method of claim 1 further including:
   adding a selected constant value to the absolute value of the difference signal prior to integration.

3. The method of claim 1 further including:
   sensing driver demand;
   providing a predetermined maximum torque signal as a function of said driver demand;
   converting said maximum torque signal to a feed forward pressure signal; and
   combining said feed forward pressure signal with said speed difference pressure signal for said clutch control valve.

4. The method of claim 3 further including:
   filtering said predetermined maximum torque signal to ameliorate sudden variations in said torque signal.

5. A method for providing a clutch control signal in a continuously variable transmission system to a fluid-actuated clutch to transfer torque between an engine and a drive line mounted in a vehicle, said clutch having an associated supply line to supply fluid to apply the clutch and discharge fluid to release the clutch controlled by a clutch control valve assembly in said supply line including:

developing a signal representative of the difference between clutch input speed and clutch output speed;
   integrating said difference signal to provide a first pressure signal;
   developing a signal representative of a selected maximum torque value based on a driver demand signal;
   modifying said maximum torque signal to provide a second pressure signal; and
   combining said first and second pressure signals for controlling said clutch control valve.

6. In a continuously variable transmission system having at least an associated clutch disengage engine speed, a lowest engine speed setpoint and a maximum engine speed and operable at least in a normal start mode for clutch control during transition from a first system state to a second system state and a special start mode for clutch control during transition from a first system state to a second system state, a method for controlling the system operation mode including:
- sensing vehicle speed during clutch disengagement,
- calculating an engine speed, which would correspond to said sensed vehicle speed if the clutch were locked up,
- comparing said calculated engine speed with the maximum engine speed and the engine speed for clutch disengagement to determine whether the calculated engine speed corresponding to said sensed vehicle speed is between those values; and
- triggering said system to operate in said special start mode when said sensed vehicle speed is not between said values.

7. The method of claim 6 further including:
- sensing when said system is in the special start mode;
- sensing engine speed;
- comparing said sensed engine speed to the clutch disengage speed; and
- switching said system to normal start mode operation when said sensed engine speed is less than said clutch disengage speed.

8. The method of claim 7 further including:
- sensing vehicle speed;
- increasing said sensed vehicle speed by a factor proportional to the transmission belt ratio;
- comparing said increased vehicle speed with the lowest engine speed setpoint;
- switching said system for operation in said special start mode when said increased vehicle speed is greater than said lowest engine speed setpoint; and
- switching said system for operation in said normal start mode when said increased vehicle speed is less than said lowest engine speed setpoint.

9. A method for generating a clutch control signal to control torque transfer at a fluid-actuated clutch in a continuously variable transmission system, said clutch being responsive to pressure in a fluid supply line controlled by a clutch control valve, comprising:
- providing a signal representative of the absolute value of a difference between a sensed clutch input speed and a sensed clutch output speed;
- adding a selected value to said signal representative of said absolute value of said difference; and then
- integrating the resulting signal to provide a speed difference signal for controlling said clutch control valve.

10. The method of claim 9 further including:
- providing a predetermined maximum torque signal as a function of a driver demand;
- converting said maximum torque signal to a feed forward pressure signal; and
- combining said feed forward pressure signal with said speed difference pressure signal for said clutch control valve.

11. The method of claim 10 further including:
- filtering said predetermined maximum torque signal to reduce sudden variations in said resulting feed forward pressure signal.

12. In a continuously variable transmission system, a method for selecting one of more than one control modes for controlling torque transfer at a clutch comprising:
- detecting conditions indicative of engine speed, clutch position, driver demand and clutch speed that represent a desired transition from a first system operating mode to a second system operating mode, said transition from a first system operating mode to a second system operating mode being representative of the system desirably being operated in one of more than one start control modes;
- enabling said system for a first start control mode when said detected conditions do not indicate that clutch lockup would cause engine acceleration; and
- enabling said system for a second start control mode when said detected conditions indicate that clutch lockup would cause engine acceleration.

13. The method of claim 12 in which said first start control mode causes said system to control engine speed through clutch pressure.

14. The method of claim 13 in which said second start control mode controls clutch actuation in accordance with a predetermined schedule based upon a driver demand and a clutch slip speed.

15. The method of claim 12 in which said second start control mode controls clutch actuation in accordance with a predetermined schedule based upon a driver demand and a clutch slip speed.

16. The method of claim 12 further comprising, after said step of enabling said system for a second start control mode, the step of:
- repeating said step of detecting; and
- enabling said system for said first start control mode when said detected conditions no longer indicate that clutch lock-up would cause engine acceleration.

17. The method of claim 16 in which said first start control mode causes said system to control engine speed through clutch pressure.

18. The method of claim 17 in which said second start control mode controls clutch actuation in accordance with a predetermined schedule based upon a driver demand and a clutch slip speed.

19. The method of claim 16 in which said second start control mode controls clutch actuation in accordance with a predetermined schedule based upon a driver demand and a clutch slip speed.

20. The method of claim 12 further comprising: sensing vehicle speed during clutch disengagement;
- calculating an engine speed, which would correspond to said sensed vehicle speed if the clutch were locked up,
- comparing said calculated engine speed with a maximum engine speed and the engine speed for clutch disengagement to determine whether the calculated engine speed corresponding to said sensed vehicle speed lies between those values; and
- enabling said system for said second start control mode when said calculated engine speed is not between said values.

21. The method of claim 20 further including:
- sensing when said system has been enabled for said second start control mode;
- sensing engine speed;
- comparing said sensed engine speed to a clutch disengage speed; and
- enabling said system for said first start control mode when said sensed engine speed is less than said clutch disengaged speed.

22. The method of claim 21 further including:
- sensing vehicle speed;

increasing said sensed vehicle speed by a factor proportional to a transmission belt ratio;
comparing said increased vehicle speed with a lowest engine speed setpoint;
enabling said system for said second start control mode when said increased vehicle speed is greater than said lowest engine speed setpoint; and
enabling said system for said first start control mode when said increased vehicle speed is less than said lowest engine speed setpoint.

23. In a continuously variable transmission system, a method for controlling torque transfer at a clutch connected between an engine and a drive line comprising:
detecting conditions in which the total torque in the system will tend to accelerate the engine; and in response
limiting torque transfer at said clutch in accordance with a predetermined schedule based upon a driver demand and a clutch slip speed.

* * * * *

UNITED STATES PATENT AND TRADEMARK OFFICE
CERTIFICATE OF CORRECTION

PATENT NO. : 5,206,805
DATED : April 27, 1993
INVENTOR(S) : Werner P. Petzold

It is certified that error appears in the above-indentified patent and that said Letters Patent is hereby corrected as shown below:

On the Title Page

In column 1, line 7 under "References Cited U.S. PATENT DOCUMENTS" delete "4,653,021" and substitute -- 4,653,621--.

In column 4, line 14, after the first occurrence of "on" insert --a--.

In column 4, line 15, delete "signal" and substitute --signal--.

In column 11 line 61, delete "25,392" and substitute --24,392--.

Column 14:

In claim 15, line 1, delete "12" and substitute --13--.

In claim 18, line 1, delete "17" and substitute --16--.

UNITED STATES PATENT AND TRADEMARK OFFICE
CERTIFICATE OF CORRECTION

PATENT NO. : 5,206,805
DATED : April 27, 1993
INVENTOR(S) : Werner P. Petzold

It is certified that error appears in the above-indentified patent and that said Letters Patent is hereby corrected as shown below:

In claim 19, line 1, delete "16" and substitute --17--.

Signed and Sealed this

Twenty-sixth Day of March, 1996

Attest:

BRUCE LEHMAN

Attesting Officer

Commissioner of Patents and Trademarks